US008526579B2

(12) United States Patent
Thomas

(10) Patent No.: US 8,526,579 B2
(45) Date of Patent: Sep. 3, 2013

(54) NOTIFICATION SYSTEM

(75) Inventor: Wendell A. Thomas, Evanston, IL (US)

(73) Assignee: Wendell A. Thomas, Evanston, IL (US)

( * ) Notice: Subject to any disclaimer, the term of this patent is extended or adjusted under 35 U.S.C. 154(b) by 0 days.

(21) Appl. No.: 12/248,628

(22) Filed: Oct. 9, 2008

(65) Prior Publication Data

US 2010/0091955 A1   Apr. 15, 2010

(51) Int. Cl.
*H04M 1/64* (2006.01)
*G06F 3/00* (2006.01)
*G06Q 99/00* (2006.01)

(52) U.S. Cl.
USPC .......... 379/88.12; 379/88.13; 379/88.23; 379/100.06; 379/202.01; 455/412.2; 455/556.2; 455/567; 701/420; 701/465; 705/71; 709/206; 709/223; 709/224; 725/61

(58) Field of Classification Search
USPC .......... 379/88.12, 67.1, 88.13, 88.23, 202.01, 379/100.06; 455/412.2, 556.2, 567; 705/71; 725/61; 701/420, 465; 709/223, 224, 206
See application file for complete search history.

(56) References Cited

U.S. PATENT DOCUMENTS

| | | | | |
|---|---|---|---|---|
| 5,434,907 A * | 7/1995 | Hurst et al. | ............ | 379/88.12 |
| 6,556,666 B1 * | 4/2003 | Beyda et al. | ............ | 379/88.12 |
| 6,760,412 B1 * | 7/2004 | Loucks | ............ | 379/88.13 |
| 6,763,299 B2 * | 7/2004 | Jones | ............ | 701/465 |
| 6,847,889 B2 * | 1/2005 | Park et al. | ............ | 701/420 |
| 6,950,502 B1 * | 9/2005 | Jenkins | ............ | 379/88.12 |
| 7,010,107 B1 * | 3/2006 | Lee et al. | ............ | 379/202.01 |
| 7,257,200 B2 * | 8/2007 | Valeriano et al. | ............ | 379/88.12 |
| 7,260,189 B2 * | 8/2007 | Silver et al. | ............ | 379/88.23 |
| 7,532,877 B2 * | 5/2009 | Lee et al. | ............ | 455/412.2 |
| 7,685,245 B1 * | 3/2010 | Rodkey et al. | ............ | 709/206 |
| 7,778,396 B2 * | 8/2010 | Vardi et al. | ............ | 379/88.12 |
| 7,995,720 B2 * | 8/2011 | Moore | ............ | 379/88.23 |
| 8,185,623 B2 * | 5/2012 | Lewis et al. | ............ | 709/224 |
| 8,255,006 B1 * | 8/2012 | Chavez et al. | ............ | 455/567 |
| 8,374,323 B2 * | 2/2013 | Tal et al. | ............ | 379/100.06 |
| 2001/0019603 A1 * | 9/2001 | McMahon | ............ | 379/67.1 |
| 2003/0046304 A1 * | 3/2003 | Peskin et al. | ............ | 707/104.1 |
| 2007/0078784 A1 * | 4/2007 | Donovan et al. | ............ | 705/71 |
| 2007/0174438 A9 * | 7/2007 | Johnson et al. | ............ | 709/223 |
| 2008/0148320 A1 * | 6/2008 | Howcroft | ............ | 725/61 |
| 2009/0005114 A1 * | 1/2009 | Wang et al. | ............ | 455/556.2 |
| 2009/0274278 A1 * | 11/2009 | Haldeman | ............ | 379/88.13 |
| 2010/0091955 A1 * | 4/2010 | Thomas | ............ | 379/88.12 |

* cited by examiner

*Primary Examiner* — Gerald Gauthier
(74) *Attorney, Agent, or Firm* — Cardinal Law Group

(57) ABSTRACT

A method for providing a notification includes receiving a notification request at a central location. The notification request includes an audible message, a notification time, and a destination. The audible message is stored at the central location and associated with the notification time and destination. A current time is determined and compared with the determined notification time. The method further includes connecting a telephone call to the destination based on the determination and transmitting the stored audible message to the destination during the telephone call based on the connection.

20 Claims, 4 Drawing Sheets

100

200

300

400

500

NOTIFICATION SYSTEM

FIELD OF THE INVENTION

This invention relates generally to notifications. More specifically, the invention relates to a notification system.

BACKGROUND OF THE INVENTION

Schedules can be an important aspect of many lives, especially when the schedule relates to important activities. Such activities can include waking up in the morning, medication schedules, medical appointments or the like. However, it is commonly understood that the aging process can erode the ability to set reminders, or even remember what the reminder is for. Numerous computerized systems have arisen to assist with this, such as personal digital assistants (PDA's), and many other computer systems. Many people do not have full or easy access to computers, rendering computerized systems of reduced utility to such people.

However, if a user of the computer system is not computer savvy, a computer system is of little use. However, many people who are not computer savvy are well acquainted with telephones, and may well be very comfortable with using the telephone. Additionally, such users may feel intimidated by computerized solutions, forget to use the computerized solutions, or not understand the message displayed on the computer. Further, any lack of familiarity with the message delivery device may adversely affect compliance with the notification.

Therefore, it would be desirable to provide a notification system and method that overcomes the aforementioned and other disadvantages.

SUMMARY OF THE INVENTION

One aspect of the invention provides a method for providing a notification. The method includes receiving a notification request at a central location. The notification request includes an audible message, a notification time, and a destination. The audible message is stored at the central location and associated with the notification time and destination. A current time is determined and compared with the determined notification time. The method further includes connecting a telephone call to the destination based on the determination and transmitting the stored audible message to the destination during the telephone call based on the connection.

Another aspect of the invention provides a computer readable medium including computer readable code for providing a notification. The medium includes computer readable code for receiving a notification request at a central location. The notification request includes an audible message, a notification time, and a destination. The audible message is stored at the central location and associated with the notification time and destination. A current time is determined and compared with the determined notification time. The medium further includes computer readable code for connecting a telephone call to the destination based on the determination and computer readable code for transmitting the stored audible message to the destination during the telephone call based on the connection.

The aforementioned, and other features and advantages of the invention will become further apparent from the following detailed description of the presently preferred embodiments, read in conjunction with the accompanying drawings. The detailed description and drawings, which are not to scale, are merely illustrative of the invention rather than limiting, the scope of the invention being defined by the appended claims and equivalents thereof.

DETAILED DESCRIPTION OF THE DRAWINGS

Figure 1:
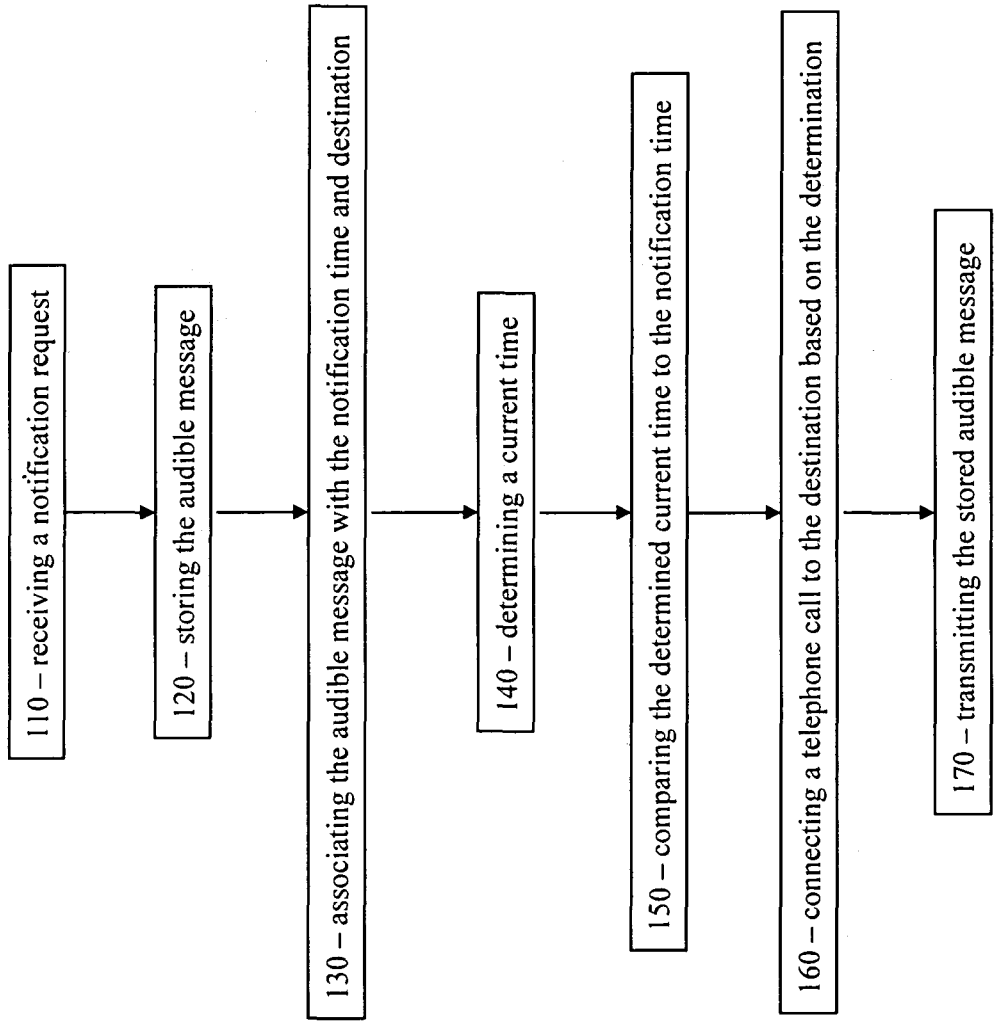
FIG. 1 illustrates an exemplary method of providing a notification in accordance with one aspect of the invention.

FIG. 1 illustrates an exemplary method 100 of providing a notification in accordance with one aspect of the invention. Method 100 begins at 110 by receiving a notification request at a central location. The notification request includes an audible message, a notification time, and a destination. The central location can be any particular location, including a geographically dispersed computer network. The notification request can be received using a computer network, such as the internet, or via a telephone line, such as a Public Switched Telephone Network (PSTN). The PSTN can be utilized using POTS or a packet data connection. Alternatively, the notification request can be received using a wireless network, such as a cellular network or satellite network. The audible message can be any series of sound waves, such as a user's voice, or a voice familiar to the user. The audible message can convey any desired message. The notification time can be any time, including at least a time of day, and further possibly including a day, month and/or year. The notification time can also be expressed in UNIX time. The destination is a telephone number to receive the notification.

At step 120, the audible message is stored at the central location. In one embodiment, a database structure is utilized to store the audible message, and in step 130, associate the audible message with the notification time and destination. A current time is determined at step 140. In one embodiment, the notification time is converted to a standardized time (such as, Eastern Standard Time, Greenwich Mean Time, UNIX time, or the like), and the current time is determined, as measured by the standardized time.

At step 150, the determined current time is compared to the notification time. The comparison may be made on an absolute match basis requiring a full match, or the comparison may be made to determine whether the current time is within a predetermined time span from the notification time. Based on the determination, the central location connects a telephone call to the destination based on the determination at step 160, and transmits the stored audible message to the destination during the telephone call based on the connection during step 170.

Figure 2:
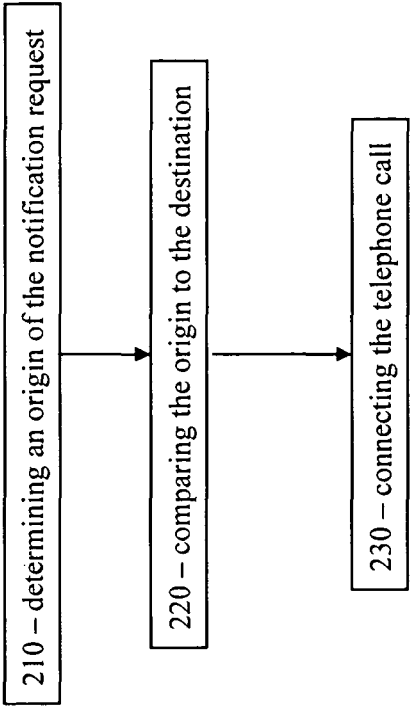
FIG. 2 illustrates an exemplary method of providing a notification in accordance with one aspect of the invention.

FIG. 2 illustrates an exemplary method 200 of providing a notification in accordance with one aspect of the invention. Specifically, method 200 focuses on connecting the telephone call. At step 210, the central location determines an origin of the notification request. At step 220, the determined origin is compared to the destination, and at step 230, the telephone call is connected based on the determination. Use of method 200 can help reduce the incidence of misdialed numbers for erroneous notifications, and ensure that the destination wishes to receive the notification.

Figure 3:
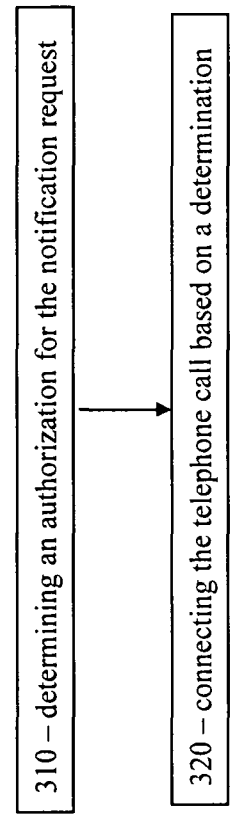
FIG. 3 illustrates an exemplary method of providing a notification in accordance with one aspect of the invention.

FIG. 3 illustrates an exemplary method 300 of providing a notification in accordance with one aspect of the invention. Specifically, method 300 focuses on connecting the telephone call. At step 310, the central location determines an authorization of the notification request. At step 320, the telephone call is connected based on the determination. Use of method 300 can help reduce the incidence of misdialed numbers for erroneous notifications, and ensure that the destination wishes to receive the notification.

Figure 4:
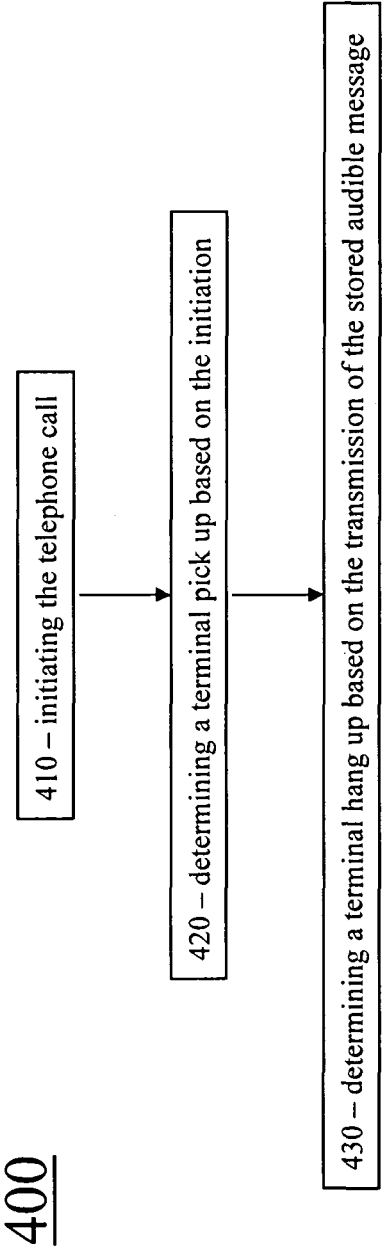
FIG. 4 illustrates an exemplary method of providing a notification in accordance with one aspect of the invention.

FIG. 4 illustrates an exemplary method 400 of providing a notification in accordance with one aspect of the invention. Specifically, method 400 focuses on connecting the telephone call. At step 410, the central location initiates the telephone call, and at step 420, the central location determines a terminal pick up based on the initiation. The central location then transmits the audible message. At step 430, the central location determines a terminal hang up based on the transmission.

Figure 5:
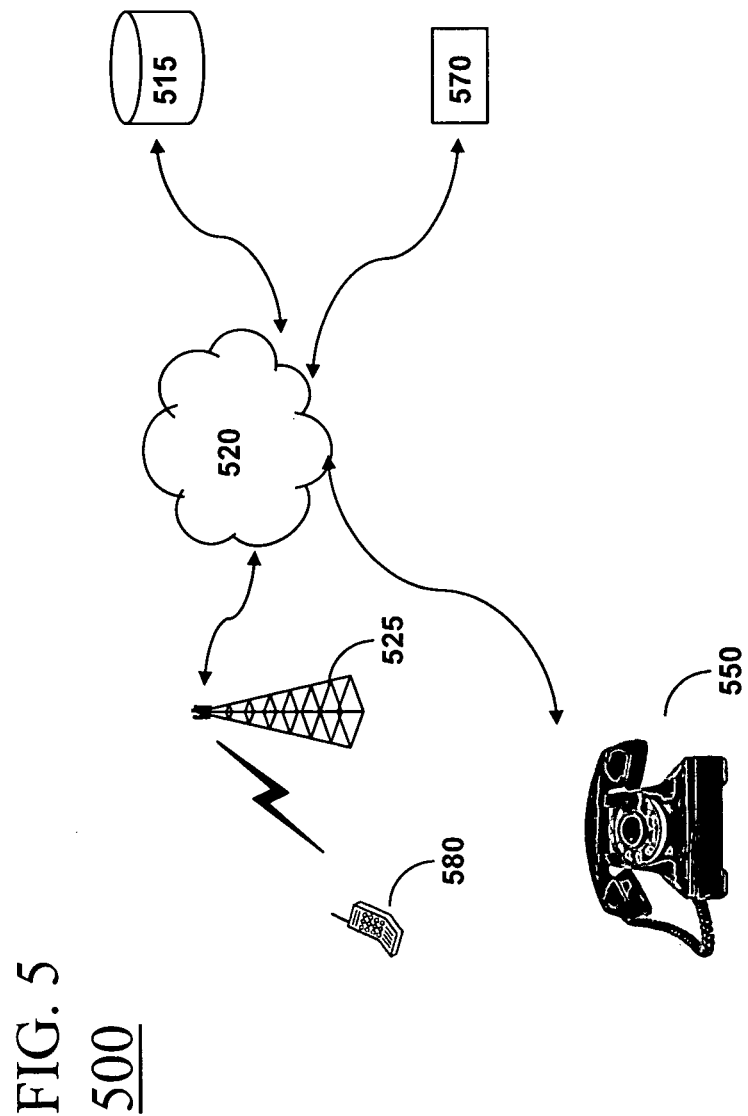
FIG. 5 illustrates an exemplary system for providing a notification in accordance with one aspect of the invention.

FIG. 5 illustrates a system 500 for providing a notification in accordance with one aspect of the invention. System 500 includes landline 550 and/or cell phone 580. Landline 550 connects to telephone network 520 directly. Cell phone 580 connects to telephone network 520 via cellular network 525. The telephone network then connects to central location 515.

In another embodiment, the system 500 includes a home unit 570 configured to receive the notification request, as well as initiate the notification. In such an embodiment, the user controls all aspects of the communication, and the notification request is not handled at a central location, but rather at a location within full control of the user. Home unit 570 includes means for receiving the notification request, such as a keypad for entering date and time information, a microphone operably connected to a storage medium for receiving and storing the audible message, and means for initiating the telephone call and transmitting the audible message over the phone line. Home unit 570 communicates with the PSTN or other communications network. Home unit 570 functions as the central location as described above, but home unit 570 is within the destination.

Using the disclosures contained herein, a person can receive notifications of important times using a trusted device, such as their telephone. More particularly, the notification can be in a trusted voice, such as the user's own voice, or the voice of their children, caretaker or the like. The notifications can be set to recur on a daily, weekly monthly, and/or yearly (or other) basis or the notification can be a one time notification. The time for the notification can be adjusted as needed.

As defined herein, "non-transitory computer readable medium" comprises all computer readable medium, with the sole exception being a transitory, propagating signal. The non-transitory computer readable medium can include volatile and/or non-volatile memory. Volatile memory can include memory that depends upon power to store information, e.g., various types of dynamic random access memory (DRAM), and the like. Non-volatile memory can include memory that does not depend upon power to store information, e.g., solid state media such as flash memory, EEPROM, phase change random access memory (PCRAM), and the like. Other exemplary non-transitory computer readable medium include optical discs such as digital video discs (DVD), high definition digital versatile discs (HD DVD), compact discs (CD), and laser discs; magnetic media such as magnetic tapes, tape drives, floppy discs, and magnetic hard drives; solid state media such as flash memory, memory cards, solid-state drives, USB flash drives, random access memory (RAM), static random access memory (SRAM), dynamic random access memory (DRAM), magnetic random access memory (MRAM), phase change random access memory (PCRAM), read-only memory (ROM), programmable read-only memory (PROM), erasable programmable read-only memory (EPROM), electrically erasable programmable read-only memory (EEPROM); and other types of media from which a computer, a processor or other electronic device can read.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for providing a notification, the method comprising:
storing a notification request at a home unit;
receiving the notification request at a central location, the notification request comprising an audible message, a notification time, and a destination;
storing the audible message at the central location;
associating the audible message with the notification time and destination;
determining a current time;
comparing the determined current time to the notification time;
connecting a telephone call to the destination based on the determination; and
transmitting the stored audible message to the destination during the telephone call based on the connection.

2. The method of claim 1 wherein connecting the telephone call comprises:
determining an origin of the notification request;
comparing the origin to the destination; and
connecting the telephone call based on a determination that the origin is the destination.

3. The method of claim 1 wherein connecting the telephone call comprises:
determining an authorization for the notification request from the destination; and
connecting the telephone call based on a determination that the notification is authorized.

4. The method of claim 1 wherein the telephone call is connected using a public service telephone network.

5. The method of claim 1 wherein the stored audible message comprises a voice known to a recipient at the destination.

6. The method of claim 1 wherein the notification request further includes a visual message associated with the audible message, and wherein transmitting the stored audible message to the destination further comprises transmitting the visual message.

7. The method of claim 1 wherein the destination is a land line.

8. The method of claim 1 further comprising:
determining whether the destination is a land line or a cell phone, and wherein connecting a telephone call to the destination is based on the determination.

9. The method of claim 8 wherein the telephone call is not connected when the destination is a cell phone.

10. The method of claim 1 wherein connecting a telephone call to the destination comprises:
initiating the telephone call; and determining a terminal pick up based on the initiation, and further comprising determining a terminal hang up based on the transmission of the stored audible message.

11. The method of claim 1 wherein the central location is a home unit.

12. A non-transitory computer readable medium including computer readable code for providing a notification, the medium comprising:
  computer readable code for storing a notification request at a home unit;
  computer readable code for receiving the notification request at a central location, the notification request comprising an audible message, a notification time, and a destination;
  computer readable code for storing the audible message at the central location;
  computer readable code for associating the audible message with the notification time and destination;
  computer readable code for determining a current time;
  computer readable code for comparing the determined current time to the notification time;
  computer readable code for connecting a telephone call to the destination based on the determination; and
  computer readable code for transmitting the stored audible message to the destination during the telephone call based on the connection.

13. The medium of claim 12 wherein computer readable code for connecting the telephone call comprises:
  computer readable code for determining an origin of the notification request;
  computer readable code for comparing the origin to the destination; and
  computer readable code for connecting the telephone call based on a determination that the origin is the destination.

14. The method of claim 12 wherein computer readable code for connecting the telephone call comprises:
  computer readable code for determining an authorization for the notification request from the destination; and
  computer readable code for connecting the telephone call based on a determination that the notification is authorized.

15. The medium of claim 12 further comprising: computer readable code for determining whether the destination is a land line or a cell phone, and wherein connecting a telephone call to the destination is based on the determination.

16. The medium of claim 12 wherein computer readable code for connecting a telephone call to the destination comprises:
  computer readable code for initiating the telephone call computer readable code for determining a terminal pick up based on the initiation, and further comprising determining a terminal hang up based on the transmission of the stored audible message.

17. A system for providing a notification, the system comprising:
  means for storing at a home unit a notification time, audible message and destination;
  means for receiving at a central location the stored notification time, audible message and destination;
  means for storing at the central location the received notification time, audible message and destination;
  means for determining a current time;
  means for comparing the determined current time to the notification time;
  means for connecting a telephone call to the destination based on the determination; and
  means for transmitting the stored audible message to the destination during the telephone call based on the connection.

18. The method of claim 1 wherein the notification request further comprises a recurrence frequency for repetition of the notification time.

19. The medium of claim 12 wherein the notification request further comprises a recurrence frequency for repetition of the notification time.

20. The system of claim 17 wherein the notification request further comprises a recurrence frequency for repetition of the notification time.

\* \* \* \* \*